United States Patent
Abe et al.

[11] Patent Number: 6,021,639
[45] Date of Patent: Feb. 8, 2000

[54] BLACK SMOKE ELIMINATING DEVICE FOR INTERNAL COMBUSTION ENGINE AND EXHAUST GAS CLEANING SYSTEM INCLUDING THE DEVICE

[75] Inventors: Yukihiro Abe; Takao Kawatsu; Yoshihide Iwamoto, all of Kanagawa-ken, Japan

[73] Assignee: Mitsubishi Heavy Industries, Ltd., Tokyo, Japan

[21] Appl. No.: 08/806,155

[22] Filed: Feb. 25, 1997

[51] Int. Cl.⁷ ....................................................... F01N 3/00
[52] U.S. Cl. ................................. 60/297; 60/300; 60/295; 60/303; 60/307
[58] Field of Search ............................... 60/297, 298, 300, 60/303, 307, 295, 286

[56] References Cited

U.S. PATENT DOCUMENTS

| | | | |
|---|---|---|---|
| 4,054,418 | 10/1977 | Miller et al. | 60/297 |
| 4,372,111 | 2/1983 | Virk et al. | 60/274 |
| 4,631,076 | 12/1986 | Kurihara et al. | 60/295 |
| 5,067,320 | 11/1991 | Kanesaki | 60/297 |
| 5,083,427 | 1/1992 | Anderson | 60/274 |
| 5,193,340 | 3/1993 | Kamihara | 60/286 |
| 5,272,874 | 12/1993 | Paas | 60/297 |
| 5,711,149 | 1/1998 | Araki | 60/278 |

FOREIGN PATENT DOCUMENTS 05044435  2/1993  Japan .

*Primary Examiner*—Thomas E. Denion
*Attorney, Agent, or Firm*—Alston & Bird LLP

[57] ABSTRACT

The temperatures of exhaust gas streams into a black smoke eliminating device are uniformly raised to assuredly burn and eliminate the black smoke at the black smoke eliminating device. Accordingly, the restoration of the black smoke eliminating device is uniformly carried out while avoiding melt damage of the filter. Further, the exit temperature of the black smoke eliminating device is descended by a simple device of lower cost. For accomplishment of the present objects, the heating device and black smoke eliminating device are provided in a plural and divided manner and there are provided a baffle member and a space portion, to thereby equalize the volume quantities and temperatures of exhaust gas flows flowing into these devices. Further, the fuel is atomized into fine particles by injection into pressurized air and the obtained mixture is uniformly mixed into the exhaust gas, so that there are uniformly raised the temperatures of exhaust gas streams into the black smoke eliminating device. The temperature of exhaust gas is descended by a simple structure of porous body disposed downstream of the black smoke eliminating device.

9 Claims, 7 Drawing Sheets

BLACK SMOKE ELIMINATING DEVICE FOR INTERNAL COMBUSTION ENGINE AND EXHAUST GAS CLEANING SYSTEM INCLUDING THE DEVICE

FIELD OF THE INVENTION AND RELATED ART STATEMENT

The present invention generally relates to an exhaust gas cleaning system for cleaning exhaust gas from an internal combustion engine such as diesel on engine and gas turbine, and particularly relates to a black smoke eliminating device for trapping and eliminating the black smoke from the exhausted gas and to an exhausted gas cleaning system including the device.

In the field of internal combustion engines, particularly diesel engines, the black smoke in the exhausted gas is becoming a subject of regulations, so that a variety of techniques have been proposed to eliminate the black smoke.

Conventionally, as a filter for eliminating the carbonaceous black smoke from exhaust gas in an internal combustion engine, there have been mainly adopted the honeycomb types of porous ceramic structures made of cordierite material which has excellent heat resistance and thermal shock resistance. However, in this type of filter, a phenomenon called loading occurs as the quantity of trapped black smoke increases. Therefore, it becomes necessary to detect such loading by a detecting means such as an exhaust gas pressure sensor, in order to carry out a restoration treatment such as combustion or back washing of the filter.

On the other hand, in the Japanese Patent Application Laid-Open Publication No.5-44435(44435/1993) is disclosed one of the conventional techniques for forcibly burning or oxidizing the exhaust gas of internal combustion engines. In this technique, fuel is introduced into the exhaust gas of a diesel engine as internal combustion engine, and thereafter agitated and mixed by means of a turbo-charger. Further, the thus obtained mixture is burnt or oxidized within a downstream filter by an oxidation catalyst carried thereby, so that the black smoke trapped by the filter is burnt by the heat generated by the burning of the mixture.

OBJECT AND SUMMARY OF THE INVENTION

The conventional technique as disclosed in the aforementioned Laid-Open Publication is however not applicable to those engines which do not have a turbo charger. Still less, this technique fails to address the heat-resistant characteristic of the oxidation catalyst. That is, the permissible quantity of trapped black smoke to be burnt for restoration has a close relation to the highest burning temperature within the filter. Thus, there is typically determined an upper limit in the quantity of black smoke trapped within the filter such that the burning temperature thereof does not exceed the heat-resisting temperature of the filter. However, oxidation catalysts represented by noble metals have their heat-resisting temperatures in the range of 500° C. to 900° C. whereas such filter materials as cordierite have their heat-resisting temperatures higher than 1,000° C. Therefore, the oxidation catalysts necessarily deteriorate with the heat generated by the burning of the black smoke. Consequently, the exhaust gas is likely to be exhausted with the mixed fuel remaining unburnt, as the number of times the restoration is carried out on the oxidation catalyst increases.

Concerning the above, it is possible to limit the quantity of black smoke to be burnt in each restoration treatment in view of the heat-resisting characteristic of oxidation catalyst. However, such limitation is practically disadvantageous, because the restoration cycle then becomes shorter and the fuel efficiency becomes low.

Further, when materials having a low thermal conductivity such as cordierite are used or when the burning reaction rate within the filter is not satisfactorily large relative to the flow rate of exhaust gas, the heat generated by the burning will be transferred to downstream of the filter so that the filter temperature is not effectively raised thus the fuel is likely to be consumed in an increased quantity.

Therefore, it is a first object of the present invention to provide a black smoke eliminating device for an internal combustion engine which is capable of solving the problems as noted above.

In addition, there exist the following points to be improved, in case that the heating device and the filter are disposed upstream and downstream, respectively, in a divided manner as in the above noted conventional technique.

Namely, referring to FIG. 10, there is shown an example of a device for eliminating black smoke in exhaust gas of an internal combustion engine 1 such as diesel engine. There are provided an exhaust pipe 11 for flowing exhaust gas from the engine 1, a heating device 3 for heating the exhaust gas, and a filter 4 for trapping the black smoke.

In the conventional exhaust gas cleaning or purifying system as constructed above, the exhaust gas from the engine 1 flows via the pipe 11 into the heating device 3, where the gas is occasionally heated to a raised temperature for allowing the black smoke to burn, and led into the filter 4. The black smoke trapped by the filter 4 burns because of the heat of the exhaust gas having elevated temperatures, so that the filter 4 is restored.

In case that the black smoke in the exhaust gas is eliminated by the black smoke eliminating device and then the restoration is effected on the device as well as the related components, the capacity of the heating device 3 for heating the exhaust gas and the filter 4 for trapping the black smoke has to be increased, as the exhaust gas from the engine increases in quantity. However, because such restrictions as those for manufacturing are imposed on the heating device 3 and the filter 4, these device and filter are divided into a plurality of components arranged in parallel with the exhaust gas flow.

Then such a problem arises that exhaust gas streams through the plurality of heating devices 3 tend to become uneven, in case of the conventional exhaust gas cleaning system as shown in FIG. 10. Also, temperatures of exhaust gas streams flowing through the plurality of the black smoke trapping filters 4 are not uniform among all the filters.

Therefore, it is a second object of the present invention to provide an arrangement of plurality of black smoke eliminating devices and plurality of heating devices which allows even flow of exhaust gas among the heating devices. At the same time, the temperatures of exhaust gas flowing into the black smoke eliminating devices are adjusted to become uniform, even when a plurality of these devices are arranged in parallel to each other, corresponding to increasing displacement volumes of the engines.

Referring to FIG. 11, there is shown another example of an exhaust gas cleaning system including a black smoke eliminating device. In this system, there is additionally provided a fuel supply device 2 for injecting the fuel into the exhaust pipe 11 in which the exhaust gas is flowing from the internal combustion engine 1, so that the temperature of exhaust gas is raised by virtue of the injection of fuel.

That is, the exhaust gas containing the injected fuel is introduced into heating device 3 of oxidation catalyst convertor type and heated by the heat of oxidation caused by the catalyst. The exhaust gas is then fed to the black smoke trapping filter 4. Then, the black smoke trapped by the filter 4 is burnt by the exhaust gas having raised temperatures.

In case of the system shown in FIG. 11 where the temperature of exhaust gas is raised by the injection of fuel, it is difficult to atomize the fuel into fine particles, and the fuel fails to equally disperse within the exhaust pipe, resulting in an uneven mixture of the exhaust gas and fuel. Thus, the restoration of the black smoke trapping filter 4 will occur only partially and the injected fuel may be eventually exhausted unburnt, also the filter 4 may be damaged by partial melting.

Thus, it is a third object of the present invention to provide a black smoke eliminating device having a remarkably improved restoration efficiency by atomizing the fuel into sufficiently fine particles so as to disperse the fuel uniformly into the exhaust gas when the fuel is injected into the exhaust gas for elevating the temperature of the exhaust gas with this device, the eventual exhaustion of unburnt fuel, overheat and melt damage of the filter which may be caused if the fuel is unevenly dispersed can be avoided.

Shown in FIG. 12 is yet another example of an exhaust gas cleaning system including a black smoke eliminating device. In this example, there is provided a means for cooling the exhaust gas, because it is disadvantageous from the safety standpoint of view to discharge the exhaust gas into the atmosphere with the temperature of the gas having been raised for burning the black smoke.

In FIG. 12, the exhaust gas from the internal combustion engine 1 is introduced via the exhaust pipe 11 into the heating device 3 such as an oxidation catalyst type convertor and heated, and thereafter led into the filter 4 to burn the trapped black smoke. The exhaust gas of high temperature, the black smoke of which has been eliminated by the filter 4, is then fed to an air-cooled cooling device 8 and cooled to a lower temperature, and then discharged out.

When an air-cooled of cooling device is to be provided to lower the temperature of exhaust gas for the elimination treatment of black smoke therein as shown in FIG. 12, the aimed effect will be achieved. However, the structure of cooling device disadvantageously becomes complicated and large in size, leading to cost increases.

It is hence a fourth object of the present invention to provide an exhaust gas cleaning system including a cooling device which has a simple and compact structure with lower costs but capable of cooling the exhaust gas to lower its temperature upon the elimination treatment of black smoke.

The black smoke eliminating device for an internal combustion engine, according to the first aspect of the present invention for attaining the first object thereof, is characterized by comprising a filter for trapping the black smoke in exhaust gas, the filter being disposed downstream from an exhaust gas exit of the engine, a fuel introducing means for introducing fuel into the exhaust gas, the fuel introducing means being disposed upstream of the filter, and an oxidation catalyst for oxidizing the fuel, the catalyst being disposed upstream of the filter.

The aforementioned problems are solved by the exhaust gas cleaning device according to the present invention, and the second aspect thereof for attaining the second object is an improvement in an exhaust gas cleaning system having a heating device for heating the exhaust gas from a thermal engine such as an internal combustion engine, and a black smoke eliminating device for eliminating the black smoke from the exhaust gas which is to be heated by said heating device, the improvement comprising the heating device and the eliminating device are each divided into a plurality of devices arranged perpendicularly to a flow direction of the exhaust gas, so as to provide divided heating devices and divided black smoke eliminating devices, and a baffle member for regulating exhaust gas flow and disposed upstream of the divided heating devices, and a space portion defined in the upstream of the divided black smoke eliminating devices.

The third aspect for attaining the third object is an exhaust gas cleaning system having a heating device for heating the exhaust gas in an exhaust pipe from a thermal engine such as internal combustion engine, and a black smoke eliminating device for eliminating the black smoke from the exhaust gas which is heated by the heating device, the system being g characterized by further comprising a fuel supply device for supplying the fuel into the exhaust gas, the fuel supply device being disposed on the exhaust pipe at an upstream position from the black smoke eliminating device, and a fuel mixing device for mixing the fuel supplied from the supply device with the exhaust gas, the mixing device being disposed in the exhaust pipe at an upstream position of the black smoke eliminating device, and the mixing device comprising a plurality of partition plates disposed along the exhaust gas flow at predetermined intervals and each formed with a through hole for passing therethrough the exhaust gas to form a turbulent flow.

The fourth aspect for attaining the third object is that in the third means the heating device comprises an oxidation catalyst convertor, and the fuel mixing device is disposed in the exhaust pipe at an upstream position from the oxidation catalyst convertor.

The fifth aspect for attaining the third object is an exhaust gas cleaning system having a heating device for heating the exhaust gas in an exhaust pipe from a thermal engine such as internal combustion engine, and a black smoke eliminating device for eliminating the black smoke from the exhaust gas which is to be heated by the heating device, the system being characterized by further comprising a pressurized air supply device for supplying pressurized air, a fuel injection device for injecting the fuel into the pressurized air to thereby atomize the fuel, the fuel injection device being disposed on the exhaust pipe at an upstream position from the black smoke eliminating device, and a mixed fluid injection device for mixing the injected fuel with the pressurized air and for injecting the thus mixed fluid into the exhaust pipe, the fluid injection device being disposed on the exhaust pipe at an upstream position from the black smoke eliminating device.

The sixth and seventh aspects for attaining the third object are characterized, in the system according to the fifth aspect, that the heating device comprises an oxidation catalyst convertor, and the mixed fluid injection device is disposed on the exhaust pipe at an upstream position from the oxidation catalyst convertor, or wherein the fuel injection device comprises a fuel pump for pressurizing the fuel from a fuel tank and feeding the pressurized fuel, a fuel regulator for regulating the pressure of the pressurized fuel fed from the fuel pump, and an injector for injecting the pressurized fuel of a regulated flow rate from the regulator into the pressurized air.

The eighth aspect for attaining the fourth object of the present invention is an exhaust gas cleaning system having a heating device for heating the exhaust gas in an exhaust pipe from a thermal engine such as internal combustion engine, and a black smoke eliminating device for eliminating the black smoke from the exhaust gas which is to be heated by the heating device, the system further comprising a porous body for descending the temperature of the exhaust gas, the porous body having multiple through holes for passing therethrough the exhaust gas and being disposed in the exhaust pipe at an downstream position from the black smoke eliminating device.

In the eighth aspect porous body preferably consists of a ceramic material.

According to the first aspect of the present invention, the means for introducing the fuel into the exhaust gas and the oxidation catalyst for burning the fuel acting as a heating means are disposed upstream of the filter in a separated manner therefrom. Thus, the oxidation catalyst is normally operable at a temperature below its heat-resisting temperature without the heat of combustion affecting at the filter, so that the deterioration of the catalyst can be restrained effectively. Further, the heat loss toward the downstream of the filter is restricted to a small extent by virtue of the thermal insulation of the filter itself, so that the heat of combustion of fuel can be effectively utilized for raising the temperature of the filter, leading to a further reduction of fuel consumption as compared to the prior art.

According to the second aspect of the present invention, the exhaust gas is uniformly distributed into the divided type of heating device by the baffle member. Further, the streams of exhaust gas as heated by the plurality of heating devices thus having possible temperature fluctuations do flow into the space portion to be mixed therein for equalizing their temperatures, and thereafter flow into the black smoke eliminating device. Thus, the plurality of black smoke eliminating devices receive the uniform flow rates and uniform temperatures of exhaust gas streams, so that there can be effectively attained the restoration of the devices by means of combustion elimination of black smoke, while advantageously dealing with an increase of flow volume of exhaust gas.

Further, according to the third and fourth aspects of the present invention, there is formed a turbulent flow of exhaust gas by means of partition plates so that the fuel is uniformly mixed into the exhaust gas and fed to the black smoke eliminating device. Consequently, the black smoke in the black smoke eliminating device uniformly burns so that overheating and melt damages of this device due to uneven dispersion of fuel, if any, can be avoided.

Still further, according to the fifth to seventh aspects of the present invention, the fuel is atomized by the fuel injection device into fine particles and thereafter mixed with the pressurized air, followed by mixing thereof with the exhaust gas by the mixed fluid injection device, so that the vaporization of fuel is effectively promoted. The exhaust gas containing therein the uniformly mixed fuel is heated by the heating device and thereafter fed to the black smoke eliminating device, so that the restoration thereof is performed at a higher efficiency while avoiding overheat and melt damage of the black smoke eliminating device due to uneven dispersion of fuel if any.

Yet further, according to the eighth aspect of the present invention, the exhaust gas passes through the through holes of the porous body disposed downstream of the black smoke eliminating device, so that the sensible heat of exhaust gas is absorbed and backwardly radiated to the upstream of the body. Thus, the temperature of exhaust gas becomes lower on the downstream side of the black smoke eliminating device. The exhaust gas is accordingly cooled by means of such an uncomplicated and compact construction of low cost that the porous body is simply disposed downstream of the black smoke eliminating device.

The above and further objects, features, details and advantages of the present invention will become apparent from the following detailed description of preferred embodiments of the invention when read in conjunction with the accompanying drawings.

DETAILED DESCRIPTION OF PREFERRED EMBODIMENTS

Figure 1:
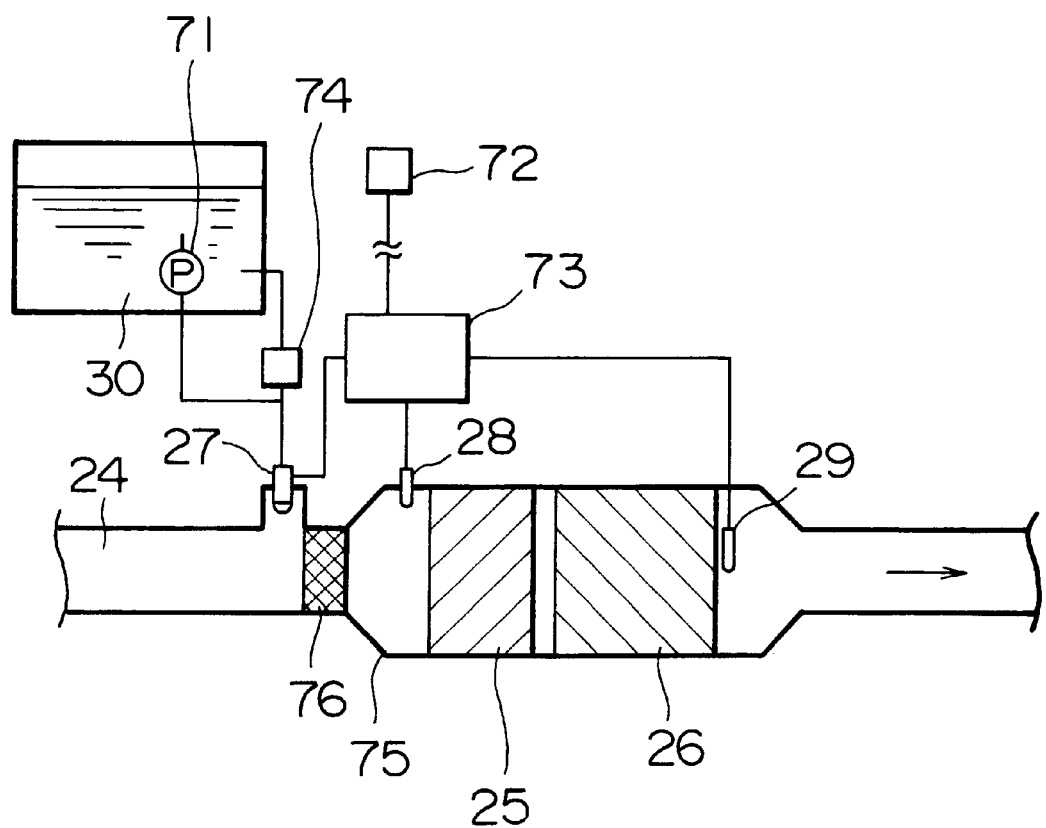
FIG. 1 is a schematic view of a whole of black smoke eliminating device according to the first embodiment of the present invention.
Figure 2:
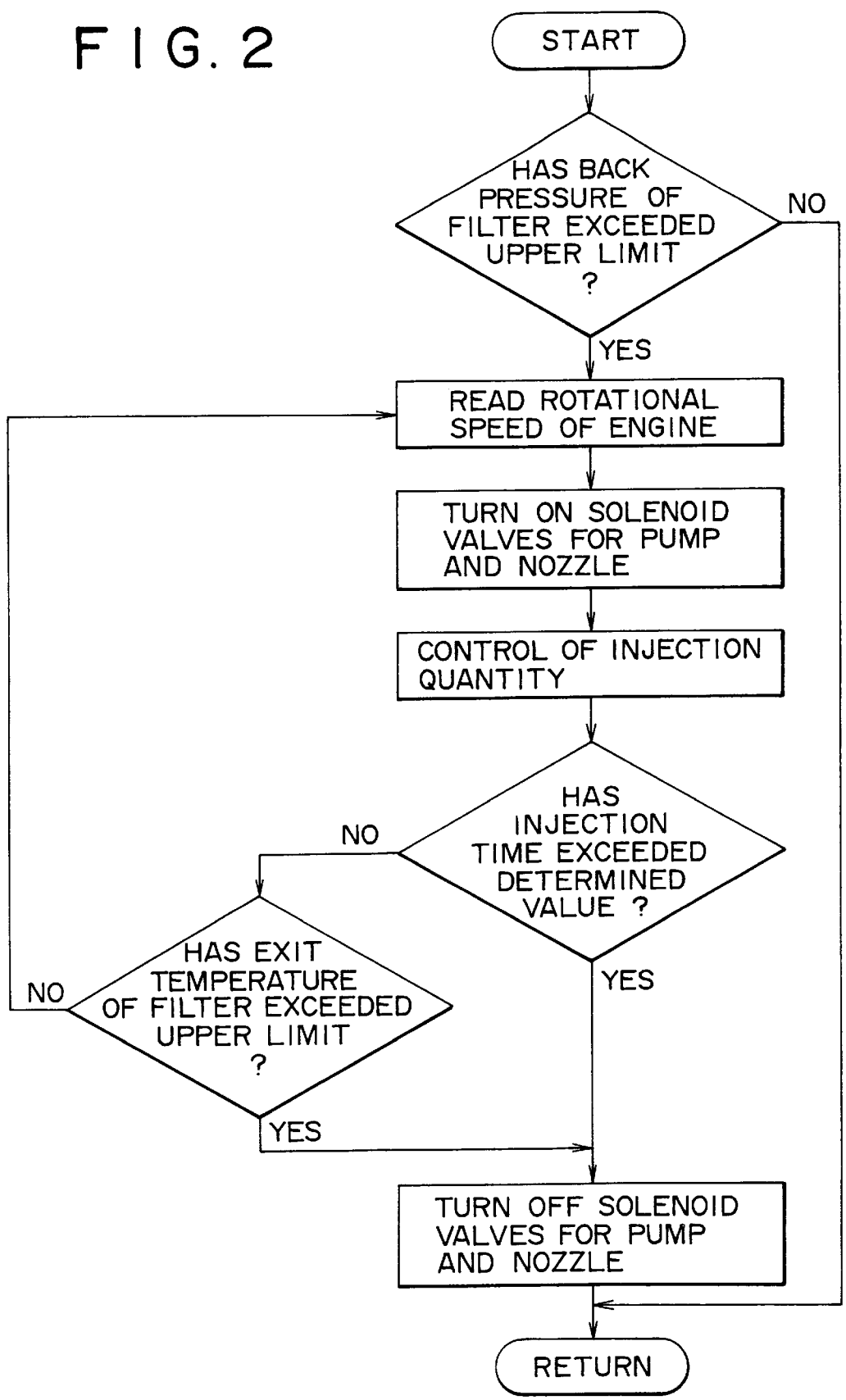
FIG. 2 is a flow chart of the operation for restoring the filter in the first embodiment.

The first embodiment according to the present invention will be described hereinafter with reference to FIGS. 1 and 2. FIG. 1 is a schematic view of a whole of this embodiment. In the internal combustion engine (not shown), there is provided a metal casing 75 containing therein an oxidation catalyst 25 and a ceramic filter 26. The catalyst 25 is disposed upstream and has a honeycomb or foamed structure, while the filter 26 is disposed downstream and has a structure such as honeycomb. There is ensured the airtightness and thermal insulation for catalyst 25 and filter 26 with respect to the metal casing 75, by means of thermally expandable ceramic seals.

In the upstream of the catalyst 25 is arranged an exhaust system 24 which includes a nozzle 27 for injecting a liquid fuel such as gas oil fed from a pump 71 within a fuel tank 30 for the liquid fuel. Between the nozzle 27 and catalyst 25 is disposed a vaporizing mixer mechanism 76 such as piled stainless steel meshes or mixer for rendering the fuel injected by the nozzle 27 be effectively vaporized by the exhaust gas and then be mixed therewith.

In the upstream of the oxidation catalyst 25 within the casing 75, there is provided a back pressure sensor 28 for detecting the loading of the filter 26. Further, in the downstream of the filter 26, there is provided a temperature sensor 29 for monitoring the burning state of the black smoke.

The signals from the sensors 28 and 29 and that from a detecting means 72 for detecting the rotational speed of the engine are fed to a control circuit 73. This circuit 73 controls the solenoid valves (not shown) with respect to their distances between opening and closing portion and durations of opening and closing actions, which valves are disposed internally of the nozzle 27 and a regulator means 74, respectively, which regulator means 74 regulates the pressure of fuel fed from the tank 30 via pump 71.

The operation of this embodiment will be described hereinafter with reference to the flow chart shown in FIG. 2. When the loading of the filter 26 is detected by the back pressure sensor 28, the signal thereof is fed to the control circuit 73. The circuit 73 then controls the nozzle 27 and regulator means 74 such that the nozzle 27 injects fuel of an amount to be predetermined in response to the rotational speed of engine which is detected by the detecting means 72. In other words, the pressure of fuel to be fed from the tank 30 by means of pump 71 is regulated to a constant value by virtue of the regulator opening angle the distance between opening and closing portion and the duration of opening and closing actions of the solenoid valve in the nozzle 27 are precisely controlled by the control circuit 73, thus the quantity of fuel to be injected is precisely controlled.

In the above, the fuel in the exhaust gas is vaporized and further mixed therewith by means of the vaporizing mixer mechanism 76 so that the exhaust gas becomes a rarefied combustible gas at the downstream of the vaporizing mixer mechanism 76. This combustible gas is catalytically oxidized or burnt at a low temperature by the oxidation catalyst 25, and the heat of combustion generated thereby causes the black smoke as trapped by filter 26 to be burnt thus eliminated. At this time, it is necessary to avoid the melt damage of the filter 26 due to an excessively raised temperature. To this end, when the temperature of exhaust gas as detected by the temperature sensor 29 exceeds a predetermined upper limit value, the signal representative thereof is fed to the control circuit 73 to stop the injection of fuel. The filter 26 is restored in such a manner as described above, and the continuous trapping of black smoke can be of course performed even during the restoring operation.

In this embodiment, the liquid fuel is vaporized and mixed with the exhaust gas by means of the vaporizing mixer mechanism 76 disposed upstream of the filter 26, and the exhaust gas is burnt at a low temperature at the catalyst 25 disposed upstream of the filter 26. Thus, the catalyst 25 is operated at a temperature lower than its heat-resisting temperature without any affection due to heat of combustion at the filter 26 disposed downstream, so that never will the catalyst 25 be deteriorated. Further, while there is burnt the black smoke as trapped by the filter 26 disposed downstream, the heat loss toward the downstream of the filter 26 can be restricted to a small extent by virtue of the thermal insulation effect of the filter 26 itself. Thus, the heat of combustion of fuel can be effectively utilized for raising the temperature of the filter 26, leading to a quantitative reduction of fuel consumption.

There will be described hereinafter further embodiments of the present invention, with reference to FIGS. 3 to 9.

Figure 3:
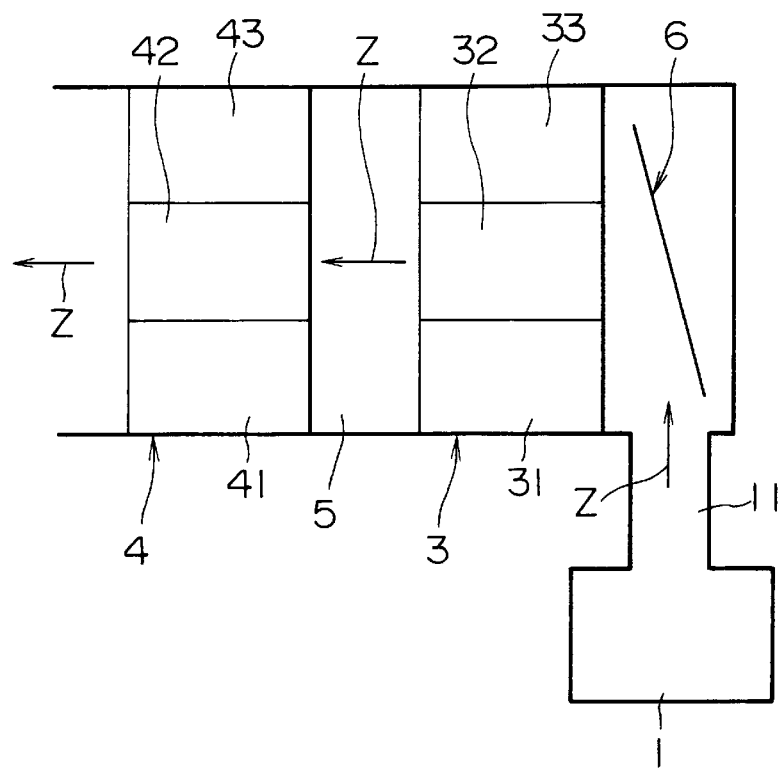
FIG. 3 is a systematic view of an exhaust gas cleaning system for an internal combustion engine according to the second embodiment of the present invention.

Shown in FIG. 3 is an exhaust gas cleaning system for an internal combustion engine according to the second embodiment of the present invention.

In FIG. 3, this system includes the heating device 3 for heating exhaust gas from the exhaust pipe 11 connected to the internal combustion engine 1 such as diesel engine, and the black smoke trapping filter 4 for trapping the black smoke in the exhaust gas.

The heating device 3 and the black smoke trapping filter 4 are provided in a plural and divided manner perpendicularly to a flow direction Z of exhaust gas, so as to provide a divided type of heating device and a divided type of black smoke eliminating device, corresponding to an increase of the displacement volume of the engine. In detail, the heating device 3 comprises three pieces of heating devices 31, 32 and 33 whereas the filter 4 comprises three pieces of black smoke trapping filters 41, 42 and 43. Although the division number for these components 3 and 4 is "three" here, it is of course possible to appropriately adopt another number in view of the characteristics of the components.

In the upstream of the plurality of heating devices 31, 32 and 33, there is disposed a baffle member 6 for regulating the exhaust gas stream Z. Further, there is defined a predetermined volume of space portion 5 between the heating device 3 and the filter 4.

There will be described hereinafter the operation of the second embodiment shown in FIG. 3. Firstly, the exhaust gas flow Z from the engine 1 is uniformly dispersed with respect to a section perpendicular to its flow direction by the baffle member 6, and thereafter uniformly flows into heating devices 31, 32 and 33. Thus, the exhaust gas is uniformly distributed into the heating devices 31, 32 and 33.

The streams of exhaust gas are then to be heated to a predetermined temperature in each of the heating devices 31, 32 and 33, where may occur a fluctuation between the heated temperatures of streams due to some reason such as capacities of the devices. Nonetheless, the streams will then flow into the predetermined volume of the space portion 5 to be mixed with one another so that their temperatures should be equalized there. The exhaust gas is then introduced into the black smoke trapping filters 41, 42 and 43, at which the black smoke is trapped to be burnt. Thus, the exhaust gas is exhausted into the atmosphere, in a cleaned condition.

As described above, each of the heating devices 31, 32 and 34 receives a uniform quantity of exhaust gas stream by means of the baffle member, so that the devices will operate effectively. In addition, the streams from these devices are equalized in temperature through the space portion 5 before flowing into each of the black smoke trapping filters 41, 42 and 42, so that the restoration of the filter 4 is effectively carried out.

Figure 4:
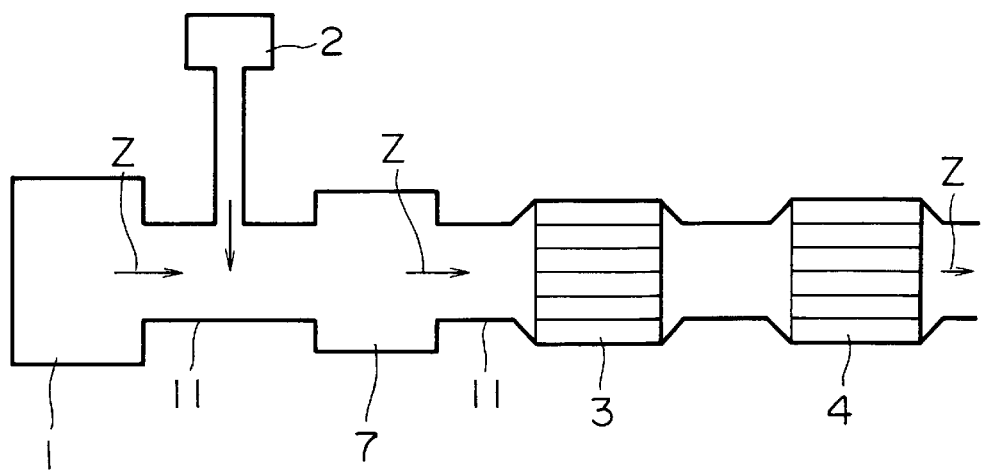
FIG. 4 is a systematic view of an exhaust gas cleaning system for an internal combustion engine according to the third embodiment of the present invention.
Figure 5:
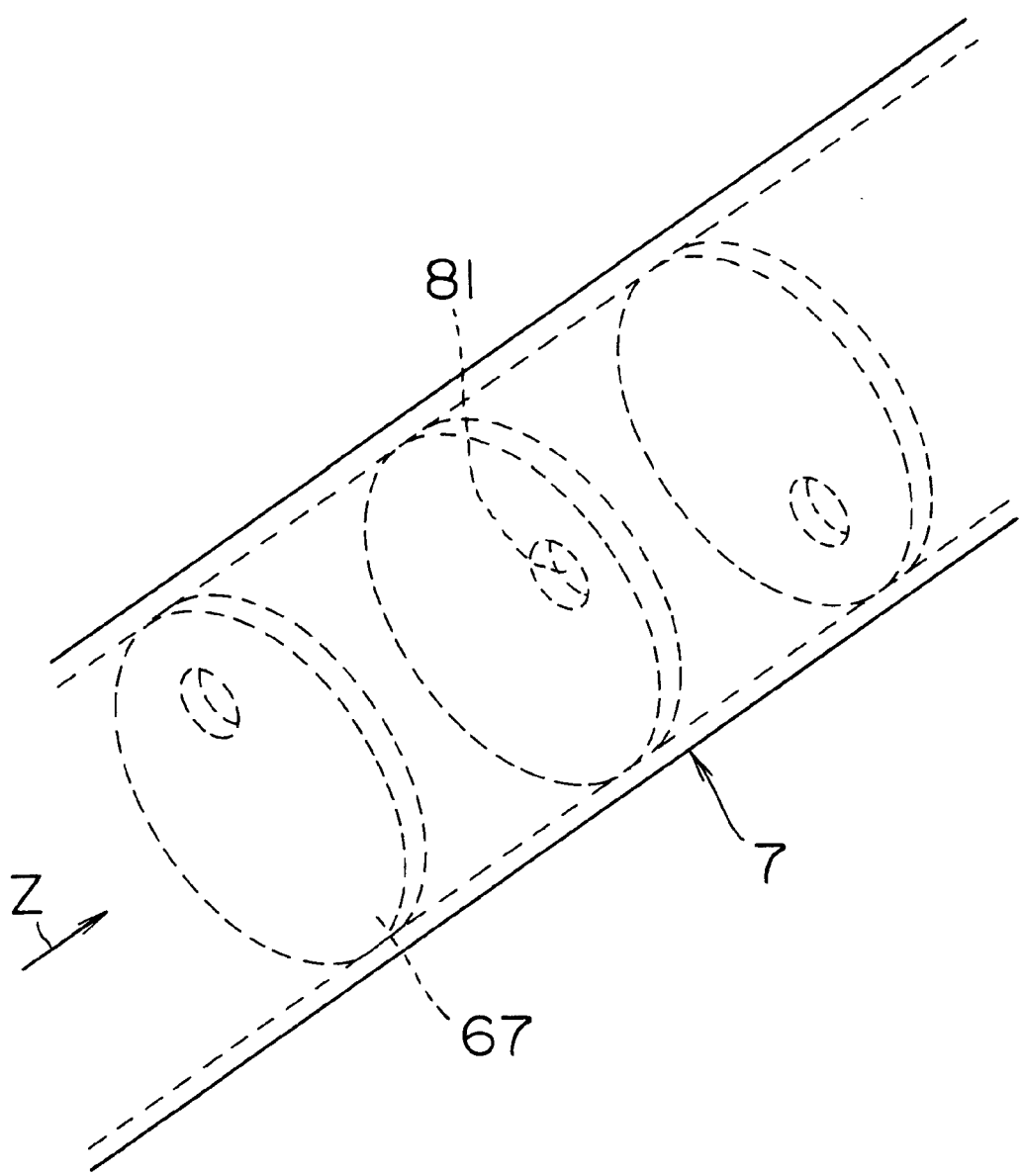
FIG. 5 is a structural view of a fuel mixing device in the third embodiment.

The exhaust gas cleaning system according to the third embodiment of the present invention is shown in FIGS. 4 and 5.

As shown in FIG. 4, this system includes the fuel supply device 2 for injecting the fuel into the exhaust pipe 11 in which the exhaust gas is flowing from the internal combustion engine 1 toward the black smoke trapping filter 4 via a fuel mixing device 7 and the oxidation catalyst convertor type of the heating device 3 for heating the fuel mixed exhaust gas from the mixing device 7 by the oxidation heat.

Referring to FIG. 5, the mixing device 7 comprises a plurality of partition plates 67 each formed with a through hole 81, and disposed at predetermined intervals along the exhaust gas flow Z. These holes 81 are divergently positioned in the circumferential or radial direction of the plates 67, so as to hasten the vertical flow of the exhaust gas containing fuel therein.

There will be described below the operation of the third embodiment.

The mixing device 7 receives the exhaust gas Z containing the fuel which is injected by the fuel supply device 2.

This exhaust gas Z will then pass through the alternately positioned holes 81 of plates 67 to form a vertical flow, whereby the fuel is uniformly mixed into the exhaust gas Z.

This exhaust gas Z containing fuel is then introduced into the oxidation catalyst convertor 3 shown in FIG. 4 to be heated there by the oxidation heat of the fuel, and thereafter fed to the black smoke trapping filter 4 so as to burn the black smoke trapped thereby. Consequently, the filter 4 is restored.

Figure 6:
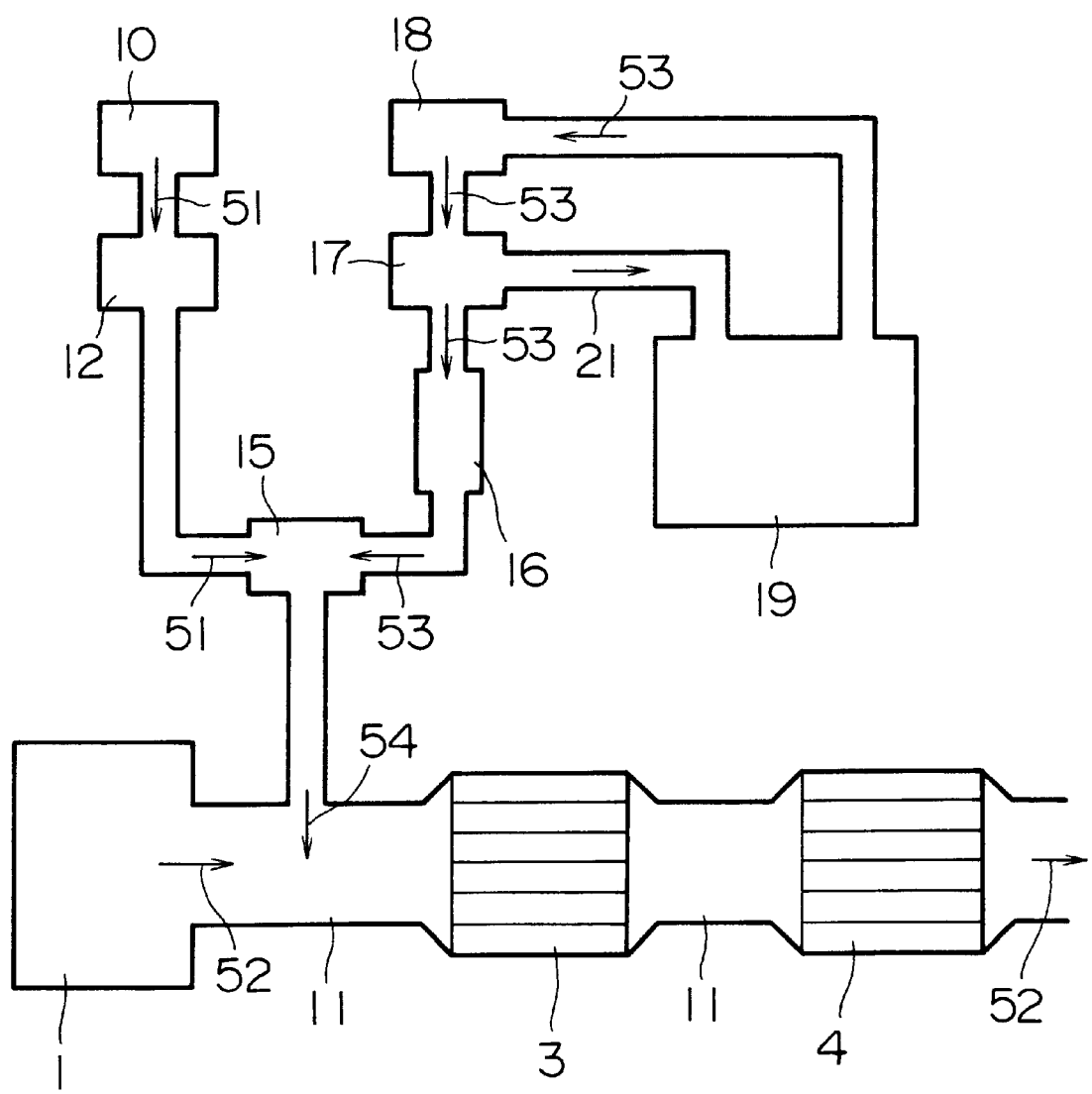
FIG. 6 is a view, corresponding to FIG. 4, of the fourth embodiment of the present invention.

FIG. 6 shows an exhaust gas cleaning system for an internal combustion engine according to a fourth embodiment of the present invention.

In FIG. 6, this system includes a fuel tank 19 for fuel 53, a fuel pump 18, a fuel regulator 17 for regulating the pressure of the fuel to a predetermined value, and an injector 16 for injecting the fuel into an injection nozzle 15 which will be explained below. The fuel 53 in the tank 19 is fed to the injector 16 via the fuel regulator 17, by the function of the pump 18.

There are further provided an air pump 10 for feeding pressurized air 51, and an air regulator 12 for regulating the air pressure to a predetermined value.

In the injection nozzle 15, the fuel from the injector 16 is injected into the pressurized air fed from the air pump 10 to establish a fuel mixed air 54, which will be then injected into the exhaust gas pipe 11 by the nozzle 15. The excessive fuel will return from the fuel regulator 17 to the tank 19 via a returning pipe 21.

The operation of the fourth embodiment will be explained below.

The pump 18 feeds the fuel 53 from the tank 19 in a pressurized manner into the fuel regulator 17 which in turn regulates the pressure of the fuel to a predetermined value and thereafter feeds the same into the injector 16. The excessive fuel from the fuel regulator 17 returns to the tank 19 via the return pipe 21.

The air pump 10 feeds air in a pressurized manner to the air regulator 12 which in turn regulates the pressure of the air to a predetermined value and thereafter feeds the same into the injection nozzle 15.

Into this pressurized air in the nozzle 15 is injected to be mixed therewith the pressurized fuel by the injector 16 which has received the fuel in the above noted manner.

The injector 16 injectingly atomizes the fuel 53 into fine particles having diameters below 50μ.

As a result, into the exhaust gas within the exhaust pipe 11 is uniformly mixed with the mixture of fairly atomized fuel and pressurized air, so that the vaporization of fuel is effectively promoted. The thus mixed exhaust gas is fed to the oxidation catalyst convertor 3, at which the exhaust gas is heated in the same manner with the third embodiment, and thereafter fed to the black smoke trapping filter 4 to burn the black smoke as trapped thereby. The restoration of the filter 4 is thus carried out.

Figure 7:
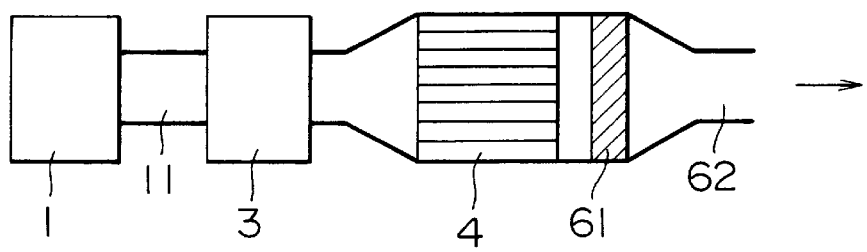
FIG. 7 is a systematic view of an exhaust gas cleaning system for an internal combustion engine according to the fifth embodiment of the present invention.

FIG. 7 shows an exhaust gas cleaning system according to the fifth embodiment of the present invention.

In FIG. 7, the exhaust gas from the engine 1 is introduced into the black smoke trapping filter 4 through the exhaust pipe 11 and heating device 3. In this embodiment, the porous body 61 is provided in the downstream of the filter 4 and has multiple small holes for cooling the exhaust gas. The temperature of exhaust gas in the downstream of the porous body 61 is detected by a temperature sensor 62.

The porous body 61 preferably consists of a heat-resistant ceramic material, and there is adopted a cordierite ceramic foam having a thickness of about 1 centimeter, in this embodiment.

The operation of the fifth embodiment is explained below.

The exhaust gas from the internal combustion engine 1 is heated by the heating device 3 and thereafter fed to the black smoke trapping filter 4 to burn the black smoke as trapped thereby so as to attain the restoration of the filter 4.

The exhaust gas from the filter 4 passes through the porous body 61 to be cooled thereby, and then exhausted into the atmosphere.

On this occasion, the latent heat of exhaust gas is absorbed by the surfaces of the porous body 61 when passing therethrough, causing a rapid descent of temperature of exhaust gas. The thus absorbed latent heat is backwardly radiated to the upstream of the porous body 61, as a radiant energy.

Consequently, there appear a field of high temperature and a field of low temperature in the exhaust gas at the upstream and downstream of the porous body 61, respectively.

Thus, the exhaust gas at the downstream of the porous body 61 is exhausted into the exterior, with the descent width of temperature of exhaust gas being typically as large as 50° C. to 100° C.

Figure 8:
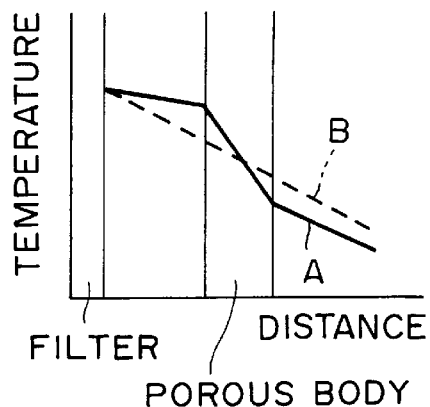
FIG. 8 is a diagram for showing a temperature transition in the fifth embodiment.

Shown in the diagram of FIG. 8 is such a temperature transition or descent attained by the provision of the porous body 61. As apparent therefrom, the fifth embodiment of the present invention provides such a cooling effect that the temperature is higher and lower on the upstream and downstream sides of the porous body 61, respectively, as compared to the conventional effect.

Figure 9:
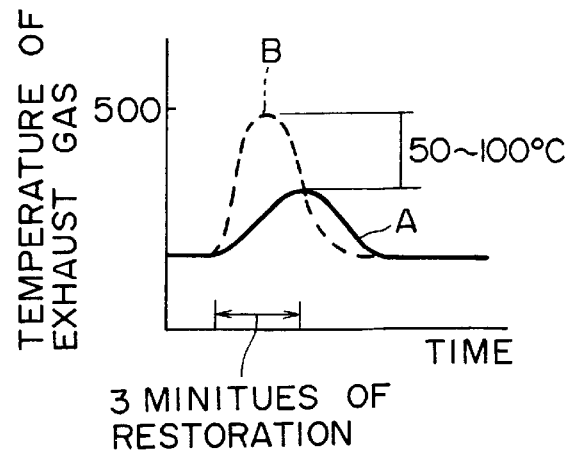
FIG. 9 is a diagram for showing a temperature transition of exhaust gas in the fifth embodiment.
Figure 10:
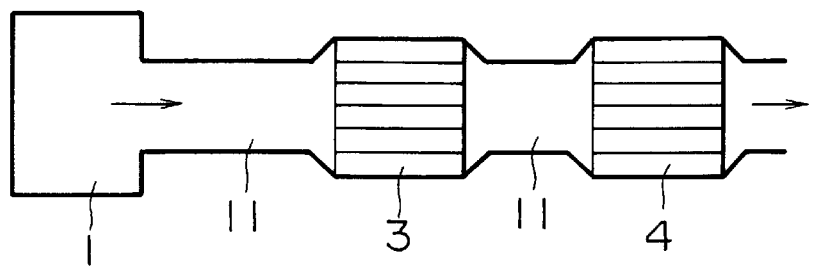
FIG. 10 is a systematic view of the conventional exhaust gas cleaning system (first example)
Figure 11:
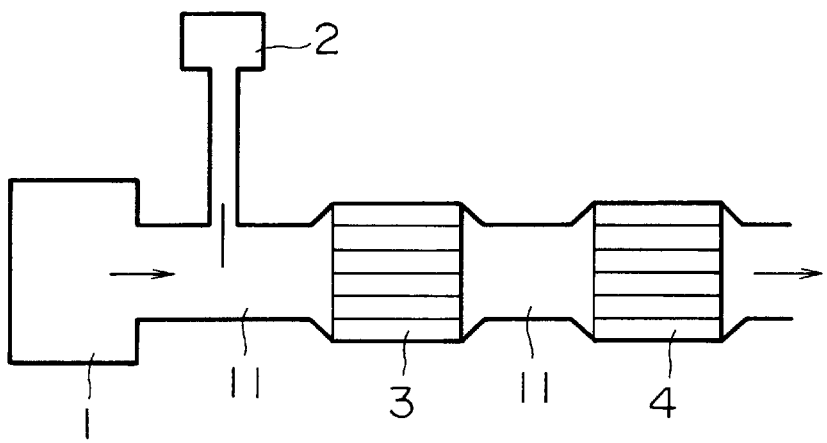
FIG. 11 is a systematic view of the conventional exhaust gas cleaning system (second example)
Figure 12:
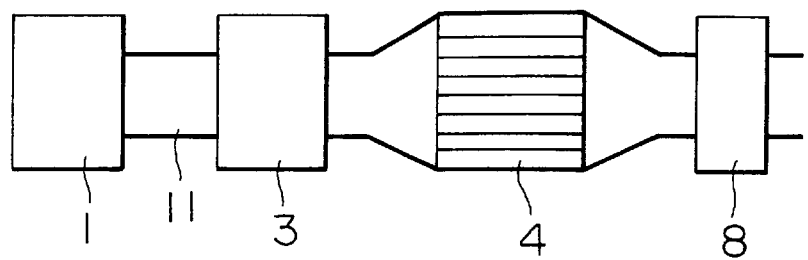
FIG. 12 is a systematic view of the conventional exhaust gas cleaning system (third example).

FIG. 9 shows a temperature transition or descent of the exhaust gas in the fifth embodiment in which is provided the porous body 61 (1 centimeter thickness) made of cordierite ceramic foam at the downstream of the black smoke trapping filter 4. As seen therefrom, this embodiment provides such a cooling effect that the temperature of exhaust gas is descended by as large as 50° C. to 100° C. as compared to the conventional effect in which no porous body is provided.

Referring again to FIG. 7, the temperature sensor 62 detects the exit temperature of exhaust gas and feeds a signal representative thereof to a controller (not shown) which controls actions of the system such as heating intensity of the heating device 3 and flow rate into the black smoke trapping filter 4, based on the thus fed signal.

The present invention is constituted in a manner as described above, so that according to its first aspect, the means for introducing the fuel into the exhaust gas and the oxidation catalyst for burning the fuel acting as a heating means are disposed at the upstream of the filter in a separated manner therefrom. Thus, there can be avoided the deterioration of the oxidation catalyst due to heat of combustion of black smoke within the filter. Further, the temperature of filter is effectively raised, leading to an increased quantitative reduction of fuel consumption as well as shortening of time for raising temperature.

According to the second aspect of the present invention, there are attained uniformities of flow rates and temperatures of exhaust gas streams into the plurality of heating devices and black smoke eliminating devices, respectively, by the provision of the baffle member and space portion. Thus, the restoration of black smoke eliminating device can be effectively carried out, whereby obtained is the black smoke eliminating device suitable for a large-sized engine having a large displacement volume.

Further, according to the third and fourth aspects of the present invention, there is obtained a vertical flow of exhaust gas by means of partition plates of the fuel mixing device, so that the mixing of fuel with exhaust gas is fully conducted. The black smoke eliminating device is therefore heated uniformly so that a partial restoration and occurrence of melt damage thereof are avoided.

Moreover, according to the fifth to seventh aspects of the present invention, the fuel as atomized by fuel injection device into fairly fine particles can be uniformly mixed into the exhaust gas. Accordingly, the heating of exhaust gas is performed uniformly and rapidly, so that the restoration of black smoke eliminating device by burnt elimination of black smoke is effectively performed without failure.

Still further, according to the eighth aspect, there can be obtained the cooling effect for exhaust gas by such a very simple and compact means of low cost that the porous body is straightforwardly provided at the downstream of black smoke eliminating device, as comparative to those conventional large-sized and so expensive devices such as air-cooled devices.

Although what have been described are at present considered to be the preferred embodiments of the invention, it will be understood that the present invention may be embodied in other specific forms without departing from the spirit or essential characteristics thereof. The present embodiments are therefore to be considered in all respects as illustrative and not restrictive. The scope of the invention is indicated by the appended claims rather than by the foregoing description.

We claim:

1. An exhaust gas cleaning system having a heating device for heating the exhaust gas from an internal combustion engine, and a black smoke eliminating device for eliminating the black smoke from the exhaust gas which is to be heated by said heating device comprising:

a plurality of heating components in said heating device and a plurality of filtering components in said eliminating device, said plurality of components in each of said heating and eliminating devices being arranged in a parallel and divided manner perpendicularly to a flow direction of the exhaust gas, so as to provide a divided type of heating device and a divided type of black smoke eliminating device;

a baffle member disposed upstream of said divided type of heating device and being arranged to provide substantially uniform distribution of said exhaust gas to said heating device; and a space portion defined at the upstream of said divided type of black smoke eliminating device of a predetermining volume sufficient to provide mixing of exhaust gases heated by said divided type of heating device to substantially equalize the temperature of said exhaust gases.

2. An exhaust gas cleaning system according to claim 1 wherein:

said heating device comprises an oxidation catalyst convertor; and said mixed fluid injection device is disposed on the exhaust pipe at the upstream of said oxidation catalyst convertor.

3. The exhaust gas cleaning system according to claim 1 wherein said baffle member comprises a substantially flat member positioned diagonally with respect to said plurality of heating components arranged in said parallel manner.

4. The exhaust gas cleaning system according to claim 2 wherein said baffle member comprises a substantially flat member positioned diagonally with respect to said plurality of heating components arranged in said parallel manner.

5. An exhaust gas cleaning system having a heating device for heating the exhaust gas in an exhaust pipe from an internal combustion engine, and a black smoke eliminating device for eliminating the black smoke from the exhaust gas which is heated by said heating device, said system further comprising:

a fuel supply device for supplying the fuel into the exhaust gas, said fuel supply device being disposed on the exhaust pipe at the upstream of said black smoke eliminating device; and a fuel mixing device for mixing the fuel supplied from said supply device with the exhaust gas, said mixing device being disposed in the exhaust pipe at the upstream of said black smoke eliminating device, and said mixing device comprising a plurality of substantially flat partition plates disposed along the exhaust gas flow at predetermined intervals and each of said partition plates being formed with a through hole for passing therethrough the exhaust gas, said holes in said partition plates being shifted relative to each other to form a turbulent flow thereof.

6. An exhaust gas cleaning system having the black smoke eliminating device according to claim 5 wherein:

said heating device comprises an oxidation catalyst convertor; and said fuel mixing device is disposed in the exhaust pipe at the upstream of said oxidation catalyst convertor.

7. An exhaust gas cleaning system exhaust pipe from an internal combustion engine, and a black smoke eliminating device for eliminating the black smoke from the exhaust gas which is to be heated by said heating according to claim 3 further comprising:

a pressurized air supply device for supplying pressurized air;

a fuel injection device for injecting the fuel into the pressurized air to thereby atomize the fuel, said fuel injection device being disposed on the exhaust pipe at the upstream of said black smoke eliminating device; and a mixed fluid injection device for mixing the injected fuel with the pressurized air and for injecting the thus mixed fluid into the exhaust pipe, said fluid injection device being disposed on the exhaust pipe at the upstream of said black smoke eliminating device.

8. An exhaust gas cleaning system according to claim 6 or 7 wherein said fuel injection device comprises:

a fuel pump for pressurizing the fuel from a fuel tank and feeding the pressurized fuel;

a fuel regulator for regulating the pressure of the pressurized fuel fed from said fuel pump; and an injector for injecting the pressurized fuel of a regulated flow rate from said regulator into the pressurized air.

9. The exhaust gas cleaning system according to claim 5 wherein said shifted holes in said partition plates are shifted circumferentially with respect to each other to promote vortical flow of the exhaust gas containing fuel therein.

* * * * *

UNITED STATES PATENT AND TRADEMARK OFFICE
CERTIFICATE OF CORRECTION

PATENT NO. : 6,021,639
DATED : February 8, 2000
INVENTOR(S) : Abe et al.

It is certified that error appears in the above-identified patent and that said Letters Patent is hereby corrected as shown below:

Title page, [56] References Cited, FOREIGN PATENT DOCUMENTS, insert the following:

--3-96611    4/1991    Japan
  60-28211   2/1985    Japan
  3-118217   12/1991   Japan
  64-83810   3/1989    Japan
  63-96211   6/1988    Japan--.

Title page, [56] References Cited, insert the following:

--OTHER PUBLICATIONS

Japan Office Action mailed 9/1/98 for Application No. 314735/1994 (with translation).

Japan Office Action mailed 9/1/98 for Application No. 186294/1995 (with translation).--.

Signed and Sealed this

Second Day of January, 2001

*Attest:*

Q. TODD DICKINSON

*Attesting Officer*  *Commissioner of Patents and Trademarks*

UNITED STATES PATENT AND TRADEMARK OFFICE
CERTIFICATE OF CORRECTION

PATENT NO. : 6,021,639
DATED : February 8, 2000
INVENTOR(S) : Abe et al.

It is certified that error appears in the above-identified patent and that said Letters Patent is hereby corrected as shown below:

Column 12, lines 32-35, cancel "exhaust pipe from an internal combustion engine, and a black smoke eliminating device for eliminating the black smoke from the exhaust gas which is to be heated by said heating"; line 35, "claim 3" should read --claim 5--.

Signed and Sealed this

Second Day of January, 2001

*Attest:*

*Attesting Officer*

Q. TODD DICKINSON
*Commissioner of Patents and Trademarks*